United States Patent
Stein et al.

(10) Patent No.: US 9,180,847 B2
(45) Date of Patent: Nov. 10, 2015

(54) METHOD FOR DETERMINING A MODEL UPSTREAM PRESSURE BY MEANS OF A MATHEMATICAL MODEL IN AN ELECTRONICALLY REGULATED MOTOR VEHICLE BRAKE SYSTEM

(75) Inventors: Michael Stein, Idstein (DE); Jochen Zimmermann, Oberwallmenach (DE); Joachim Borneis, Darmstadt (DE); Dieter Burkhard, Bingen-Büdesheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/349,701

(22) PCT Filed: Aug. 9, 2012

(86) PCT No.: PCT/EP2012/065611
§ 371 (c)(1),
(2), (4) Date: Jul. 1, 2014

(87) PCT Pub. No.: WO2013/050195
PCT Pub. Date: Apr. 11, 2013

(65) Prior Publication Data
US 2014/0350817 A1   Nov. 27, 2014

(30) Foreign Application Priority Data
Oct. 6, 2011 (DE) .......................... 10 2011 084 069

(51) Int. Cl.
*B60T 8/172* (2006.01)
*B60T 8/1755* (2006.01)
*B60T 8/48* (2006.01)

(52) U.S. Cl.
CPC ............. *B60T 8/172* (2013.01); *B60T 8/17551* (2013.01); *B60T 8/4872* (2013.01); *B60T 2270/14* (2013.01); *B60T 2270/204* (2013.01); *B60T 2270/308* (2013.01)

(58) Field of Classification Search
CPC ..... B60T 8/172; B60T 8/4275; B60T 8/4872; B60T 2270/14; B60T 2270/204; B60T 2270/208; B60T 2270/308
USPC .......................................................... 701/70
See application file for complete search history.

(56) References Cited

U.S. PATENT DOCUMENTS 3,620,576 A * 11/1971 Wehde et al. .................. 303/154
4,468,740 A *  8/1984 Beck et al. ...................... 701/76

(Continued)

FOREIGN PATENT DOCUMENTS

DE   10 2006 022 701 A1   11/2007
DE   10 2006 033 351 A1    1/2008

(Continued)

OTHER PUBLICATIONS

JPO machine translation of JP 09-323634 (original JP document published Dec. 16, 1997).*
Wikipedia article, "Low-pass filter", Old revision dated Oct. 4, 2011 (8 pages).*
PCT International Search Report—Oct. 29, 2012.
German Examination Report—Jul. 25, 2012.

*Primary Examiner* — Behrang Badii
*Assistant Examiner* — David Testardi
(74) *Attorney, Agent, or Firm* — Brinks Gilson & Lione

(57) ABSTRACT

Method for determining a model upstream pressure ($P_{TMC\_mod}$) using a mathematical model in a motor vehicle brake system. An electrically controllable hydraulic valve (7a, 7b) control brake pressure on a wheel brake. Wheel sensors (10a, 10b) provide a vehicle speed signal. From the vehicle speed signal ($v_{ref}$) generating at least a first low pass filtered vehicle speed signal ($V_{ref\_fast}$, $V_{ref\_hard}$, $V_{ref\_soft}$) for using with a first limit frequency ($f_{g1}$, $f_{g2}$, $f_{g3}$), from whose time profile the point in time ($t_1$) of a significant decrease is detected, used for determining a time duration (Timer) starting with deceleration of the vehicle, which ends at the onset of regulation of the braking process. For the classification of the actuation speed of the brake pedal (16) the time duration (Timer) is compared with one or more threshold values ($SW_1$, $SW_2$). Depending on the comparison, determining a model upstream pressure ($P_{TMC\_mod}$) using the mathematical model.

15 Claims, 6 Drawing Sheets

(56) References Cited

U.S. PATENT DOCUMENTS

| | | | | |
|---|---|---|---|---|
| 4,635,031 A | * | 1/1987 | Blomberg et al. | 303/157 |
| 4,896,924 A | * | 1/1990 | Kuwana et al. | 303/176 |
| 5,123,714 A | * | 6/1992 | Mori | 303/199 |
| 5,736,852 A | * | 4/1998 | Pattantyus | 324/166 |
| 6,009,366 A | * | 12/1999 | Burkhard et al. | 701/71 |
| 6,048,038 A | * | 4/2000 | Zaviska et al. | 303/113.1 |
| 6,122,585 A | * | 9/2000 | Ono et al. | 701/71 |
| 6,123,395 A | * | 9/2000 | Wolf et al. | 303/11 |
| 6,182,001 B1 | * | 1/2001 | Sugai et al. | 701/78 |
| 6,322,169 B1 | * | 11/2001 | Fennel | 303/186 |
| 6,446,490 B1 | * | 9/2002 | Lohner et al. | 73/39 |
| 7,681,962 B2 | * | 3/2010 | Fulmer et al. | 303/155 |
| 7,699,411 B2 | * | 4/2010 | Nakaura et al. | 303/156 |
| 2001/0013722 A1 | * | 8/2001 | Udaka | 303/28 |
| 2005/0179317 A1 | * | 8/2005 | Kosaka | 303/186 |

FOREIGN PATENT DOCUMENTS

| | | | | |
|---|---|---|---|---|
| DE | 10 2006 056 673 A1 | | 6/2008 | |
| EP | WO 97/27090 | | 7/1997 | |
| EP | WO 99/26819 | | 6/1999 | |
| EP | WO 2005/007475 A1 | | 1/2005 | |
| JP | 08104219 A | * | 4/1996 | B60T 8/58 |
| JP | 09323634 A | * | 12/1997 | B60T 8/58 |
| JP | 10132835 A | * | 5/1998 | G01P 3/481 |
| JP | 2007030722 A | * | 2/2007 | |
| JP | 2008290474 A | * | 12/2008 | |
| WO | WO 9117072 A1 | * | 11/1991 | B60T 8/88 |

\* cited by examiner

METHOD FOR DETERMINING A MODEL UPSTREAM PRESSURE BY MEANS OF A MATHEMATICAL MODEL IN AN ELECTRONICALLY REGULATED MOTOR VEHICLE BRAKE SYSTEM

CROSS REFERENCE TO RELATED APPLICATIONS

This application claims priority to German Patent Application No. 10 2011 084 069.9, filed Oct. 6, 2011 and PCT/EP2012/065611, filed Aug. 9, 2012.

FIELD OF THE INVENTION

The invention relates to a method for determining a model upstream pressure by means of a mathematical model in an electronically regulated motor vehicle brake system.

BACKGROUND OF THE INVENTION

Depending on equipment variants, electronic motor vehicle brake systems frequently includes additional functions besides the basic ABS function, such as traction control system (TCS), electronic stability program (ESP), adaptive cruise control (ACC) etc., which in part use subfunctions of the ABS control system.

There are various expensive variants of previously described motor vehicle brake systems on the market; such brake systems that can perform the brake regulation task to be carried out without pressure sensors may be mentioned here in connection with the present invention. Practically all the internal computing variables that are necessary for brake regulation are obtained on the basis of the wheel revolution rate sensors connected to the brake system. Thus especially with the controllers, on which the invention is based, there is no pressure sensor for the upstream pressure applied by the driver, that is the TMC (tandem master cylinder) pressure, as is usual with ESP controllers.

For brake systems without TMC pressure sensors, the upstream pressure (TMC pressure) and the wheel pressure are computed with a model, wherein their difference represents the relevant difference pressure for inlet valve control.

It is thus known from WO 2005/007475 AI to determine the upstream pressure (TMC pressure) by means of the stopping behavior of the ABS return pump operating in the PWM mode by using the generator voltage detected during the switch-off phase as a measure of the upstream pressure.

The wheel pressure can be computed iteratively, starting from a starting value at the point in time of the onset of brake regulation by means of a model, which uses as input variables the modeled TMC pressure, the modeled wheel pressure from a previous computational step (from the last loop) and valve switching times of an inlet and outlet valve of the corresponding wheel.

Up to the point in time of the onset of brake regulation, the associated inlet valves are in the normal, i.e. open, state, so that the pressure in the wheel essentially corresponds to the upstream pressure, i.e. to the pressure in the TMC (tandem master cylinder). Since at the point in time the ABS return pump is still not delivering any voltage information, the starting value for TMC pressure and the wheel pressure can be determined by analysis of the deceleration of the vehicle and the time duration between a brake pedal operation and the onset of brake regulation.

For this, reference is made to DE 10 2006 056 673 A1, which describes a brake regulation method for a motor vehicle brake system, which uses the signal of an upstream pressure sensor during anti-locking regulation at least for the computation of the current wheel pressure, and in the event of a failure of the upstream pressure sensor or in the event of a faulty upstream pressure sensor forms a substitute upstream pressure sensor from a vehicle-specific brake pressure-deceleration characteristic stored in the brake system, wherein a special brake pressure-deceleration characteristic is provided both for the rear axle and also for the front axle.

The known brake regulation method models the upstream pressure such that the value determined from the deceleration of the vehicle is subjected by means of the brake pressure-deceleration characteristic to a safety offset or a safety factor in order to prevent the upstream pressure from being underestimated by the controller, whereby otherwise excessively long valve opening times would arise. Furthermore, it is proposed to increase the pressure from the pressure-deceleration characteristic by a factor or an offset if the brake pedal is depressed very rapidly by the driver (so-called hard braking), since otherwise because of dead times within the deceleration signal generation and within the hydraulics there can be differences between the actual deceleration of the vehicle and the corresponding deceleration signal. The deceleration of the vehicle is computed from the signals of wheel revolution rate sensors.

However, the known method, especially for a high actuation speed of the brake pedal, i.e. for so-called hard pedal operation, does not always lead to a satisfactory result with regard to the model upstream pressure, because the deceleration of the vehicle cannot be computed with sufficient quality at the point in time of the start of brake regulation.

Furthermore, a method for modeling an upstream pressure for a motor vehicle brake system is known from DE 102006022701 A1, with which at the start of a deceleration of the vehicle a counter is started that is incremented with a specified value G and is reset if the speed of the vehicle increases. At the start of regulation the upstream pressure is computed from the counter value by multiplication with a vehicle-specific and axle-specific parameter and is used as a starting value for the brake regulation. The value G used as the gradient of the increase models the gradient of the TMC increase for the upstream pressure and is reduced on reaching specified counter values by means of a reduction factor, which causes flattening of the modeled pressure rise gradient. For brake regulation by means of another model, which is known e.g. from WO97/27090, the starting value for the upstream pressure is used to determine a model wheel pressure for regulation.

The known method in accordance with WO97/27090 for determining the model upstream pressure is based on a computation of the locking pressure level at the start of brake regulation based on the deceleration of the vehicle, which is determined from the wheel speed signals.

The object of the invention is to specify a method mentioned above, with which a model upstream pressure can be determined with high reliability and high robustness against disruptive influences.

This object is achieved by a method with the features described herein.

SUMMARY AND INTRODUCTORY DESCRIPTION OF THE INVENTION

The present invention provides a method for determining a model upstream pressure by means of a mathematical model in an electronically regulated motor vehicle brake system, with which the regulation of an electrically controllable hydraulic valve causing a build-up of brake pressure on at least one wheel brake is carried out by using the model upstream pressure as at least one parameter, and with which wheel sensors for determining a vehicle speed signal indicating the speed of the vehicle and a brake pedal that can be operated are provided. It is characterized according to the invention in that at least one first low pass filtered vehicle speed signal is generated from the vehicle speed signal by means of a low pass filter with a first limit frequency, from whose time profile the point in time of a significant decrease is detected, which acts as a starting criterion for determining a time duration (Timer) beginning with a deceleration of the vehicle initiated by a braking process and ending at the point in time of the onset of regulation of the braking process; the time duration is compared with at least one first or second threshold value for classification of the actuation speed of the brake pedal, and a model upstream pressure is determined by means of the mathematical model depending on the comparison result.

With the method according to the invention, which analyzes a low pass filtered vehicle speed signal for detecting the point in time of the start of the deceleration of the vehicle, and hence makes it possible to determine the time duration until the start of brake regulation, the actuation speed of the brake pedal, which determines the TMC pressure gradient and hence the upstream pressure, can be concluded with high accuracy. The low pass filtering of the variable "vehicle speed" leads to a signal that is proportional to distance as it forms the integral of the speed, which shows a characteristic and pronounced "kink", i.e. a decreasing profile at the point in time of the start of the deceleration of the vehicle, which is more pronounced the higher the actuation speed of the brake pedal, i.e. especially for "hard braking". Here it is especially exploited that the integral value also decreases with decreasing signal amplitude in the event of integration by means of a digital low pass filter with a low limit frequency.

Furthermore, the essential advantage is that the point in time of the start of braking is detected independently of e.g. a brake light switch (BLS) signal, whereby the robustness of the method for TMC and wheel pressure estimation results in high accuracy of the TMC and wheel pressure estimation because of an absence of falsifying influences of a brake light switch, such as installation position, clamping and trigger speed being missing.

In a particularly advantageous embodiment of the invention, at least one second low pass filtered vehicle speed signal is produced by means of a low pass with a lower limit frequency compared to the first limit frequency, and is controlled for determining the point in time that is used as a starting criterion for computation of the time duration of a first counter depending on the difference of the first and second low pass filtered vehicle speed signals.

Because slow changes can be detected with the first low pass filtered vehicle speed signal owing to the higher, especially significantly higher, limit frequency compared to the second low pass filtered vehicle speed signal, an offset drift can be essentially eliminated with the formation of the difference of the first and second low pass filtered vehicle speed signals. With a low limit frequency of the second low pass filtered vehicle speed signal, a high actuation speed of the brake pedal, i.e. hard braking, can be reliably detected.

With a further reduced limit frequency compared to the limit frequency of the second low pass filtered vehicle speed signal, according to a further development a third low pass filtered vehicle speed signal is produced, with which a low actuation speed of the brake pedal, i.e. light braking, is detected, and a second counter is controlled for determining the point in time that is used as a starting criterion for the computation of the time duration depending on the difference of the first and third low pass filtered vehicle speed signals. Here too an offset drift is corrected based on the difference formation with the first low pass filtered vehicle speed signal.

In another embodiment of the invention, the first or second counter is incremented when the difference of the first and second or first and third low pass filtered vehicle speed signals exceeds a first threshold value and is reset if the difference falls below a second threshold value, wherein preferably at the start of regulation of the braking process the counter value of the first or second counter with the highest counter value is used as a time duration. The time duration determined in this way reproduces the TMC gradient very accurately, starting with the deceleration of the vehicle until the start of brake regulation, so that a likewise accurate model upstream pressure can be determined based on the time duration.

The reliability of the determination of the model upstream pressure or the reliable detection of the actuation speed of the brake pedal can be improved if, in accordance with one embodiment of the invention, the deceleration of the vehicle is determined from the signals of the wheel revolution rate sensors and is compared with an upper threshold value and a lower threshold value, and a third counter is provided that is incremented if the deceleration of the vehicle exceeds the upper threshold value and is reset if the deceleration of the vehicle is less than the lower threshold value. The variable is preferably determined from the counter values of the three counters by selecting two counter values with the lowest values from the counter values achieved by the first, second and third counters at the start of regulation of the braking process and the average value of the counter values of the two counters represents the value of the variable Timer.

A vehicle-specific brake pressure-deceleration characteristic stored in the brake system can be used particularly advantageously as a mathematical model for determining the model upstream pressure.

Hence, according to a further development, the model upstream pressure is determined from the deceleration of the motor vehicle and the brake pressure-deceleration characteristic if the time duration has at least the value of the first threshold value. In the other case an estimation of the coefficient of friction is carried out, and on detecting a road with a high coefficient of friction with a specified deceleration value, which is preferably 1 g, a model upstream pressure is determined by means of the brake pressure-deceleration characteristic.

An alternative determination of the model upstream pressure arises in accordance with a development of the invention in that this is determined from the deceleration of the motor vehicle and the brake pressure-deceleration characteristic if the counter value of the first counter is greater than or equal to a first threshold value and the counter value of the second counter is greater than or equal to a further first threshold value. Otherwise, here too an estimation of the coefficient of friction is carried out and, on detecting a road with a high coefficient of friction with a specified deceleration value, a model upstream pressure is determined by use of the brake pressure-deceleration characteristic with a specified deceleration value, which is preferably 1 g. Because the pressure deceleration characteristic represents the relationship between the locking pressure and the deceleration of the vehicle in the steady state during regulation, a factor k (normally 1 to 1.3) can be taken into account, with which the pressure determined from the characteristic is multiplied in order to take account of a pressure increase at the start of regulation.

In one embodiment of the invention, a vehicle-specific TMC pressure gradient-coefficient of friction characteristic stored in the brake system is provided as a further mathematical model for determining the model upstream pressure, wherein the model upstream pressure is computed as the product of the TMC pressure gradient (Grad), determined by means of a coefficient of friction and the TMC pressure gradient-coefficient of friction characteristic, and the value of the time duration if there is no high coefficient of friction and the value of the time duration is less than a second threshold value.

If, however, the value of the time duration of the second threshold value is reached and is lower than the first threshold value and also there is no high coefficient of friction, then using the further model the model upstream pressure is determined as an estimated function depending on the TMC pressure gradient (Grad) determined by means of a coefficient of friction and the TMC pressure gradient-coefficient of friction characteristic, the value of the time duration and the value determined by means of the deceleration of the motor vehicle and the brake pressure-deceleration characteristic.

Preferably, for producing the first, second and third low pass filtered vehicle speed signals a low pass, preferably a first order low pass, is used, which is simple to implement.

BRIEF DESCRIPTION OF THE DRAWINGS

The method according to the invention is explained in detail and described below with reference to the accompanying figures. In the figures.

ADDITIONAL DETAILED DESCRIPTION

Figure 1:
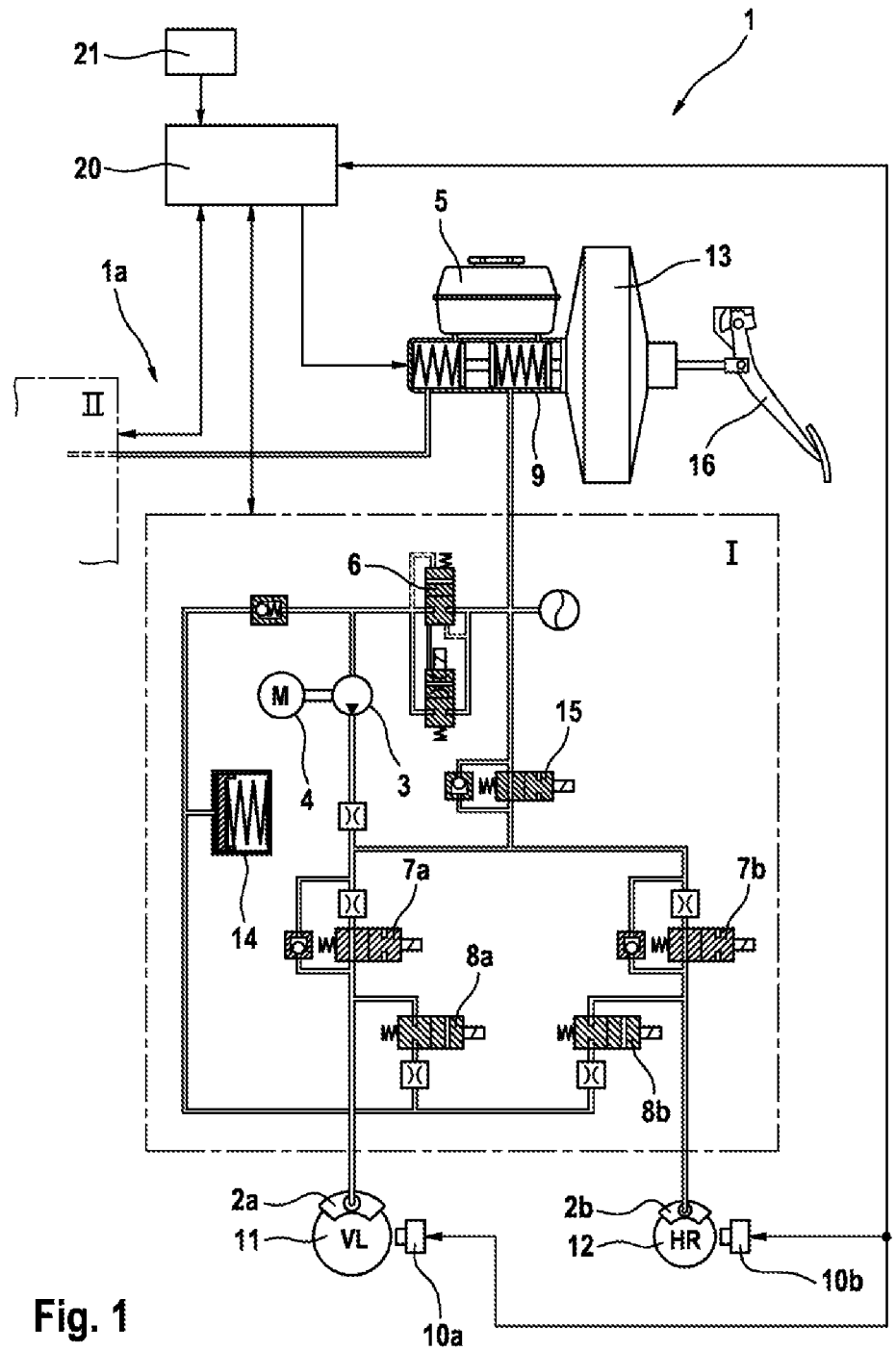
FIG. 1 shows a schematic block diagram of an electronically regulated motor vehicle brake system for implementation of the method according to the invention.

FIG. 1 shows an electronically regulated motor vehicle brake system 1 with a brake system 1a of a motor vehicle with a controller 20 of an electronic stability control system (ESC system), to which sensor data of an ESC sensor 21 are delivered.

The controller 20 controls the brake system 1a, wherein FIG. 1 only shows a brake circuit I for a front left wheel 11 and a rear right wheel 12 connected to a brake cylinder (TMC-tandem master cylinder) 9; a second brake circuit II is correspondingly designed and likewise connected to the brake cylinder 9 and is only shown indicatively. Wheel brakes 2a or 2b of the wheels 11 and 12 are respectively connected to the brake circuit I by means of a hydraulic line.

The brake system 1 includes a brake booster 13 connected to the brake cylinder 9 and a reservoir container 5 for the brake fluid or the hydraulic fluid. The brake cylinder 9 produces a brake pressure P at the outlet as the upstream pressure corresponding to a brake pedal 16 connected to the brake booster 13, which is operated by a driver. The upstream pressure is delivered via an open isolating valve 15 to a respective open inlet valve 7a or 7b on the inlet side, so that a corresponding hydraulic brake pressure can build up at the wheel brakes 2a and 2b of wheels 11 and 12. The two inlet valves 7a and 7b are normally open. The brake booster 13 with the brake master cylinder 9 is connected to the controller 20.

A normally closed outlet valve 8a or 8b connects the wheel brakes 2a or 2b to a low pressure reservoir 14, which for its part is connected to a hydraulic pump 3 on the suction side and can be connected via a changeover valve 6 to the brake master cylinder 9.

The hydraulic pump 3 is provided for the wheel brakes 2a and 2b, in order e.g. to pump back out the brake medium displaced in the event of a pressure decrease in the low pressure reservoir 14 in the case of an ABS or ESC intervention.

The hydraulic pump 3 is driven by an electric motor 4, which for its part is controlled by the controller 20 by pulse width modulation (PWM). The electric motor 4 is thereby controlled such that the hydraulic pump 3 can build up brake pressure on the high pressure side by sucking in brake fluid on the suction side.

So that brake fluid can be sucked out of the pressure chamber of the brake caliper 2a or 2b when driving the hydraulic pump 3 in the stepper motor mode, the changeover valve 6 and the inlet valve 7a or 7b are closed, whereas the outlet valve 8a or 8b is open to make the connection to the pressure chamber.

Respective revolution rate sensors 10a and 10b are available for detection of the rotational behavior of the wheels 11 and 12, feeding their sensor signals to the controller 20 for analysis, especially in order to determine a vehicle speed signal $V_{ref}$ from this.

Finally, no pressure sensors are required in the electronically regulated motor vehicle brake system 1, i.e. neither a pressure sensor for determining the wheel pressure nor a pressure sensor for determining the upstream pressure that is applied on the input side to the regulating hydraulics; the pressure is thus e.g. essentially identical to the pressure built up by the brake master cylinder 9 in the event of brake operation of the brake pedal 16.

In order to be able to operate analog inlet valve regulation at the inlet valve 7a or 7b, knowledge of the difference pressure occurring across the inlet valve 7a or 7b is necessary. For the electronically regulated motor vehicle brake system 1 with a hydraulic brake system 1a in accordance with FIG. 1, which requires no TMC pressure sensor, the TMC pressure is computed as a model upstream pressure and the wheel pressure is computed as a model wheel pressure in a model, wherein their difference represents the relevant difference pressure for the inlet valve control of the inlet valve 7a or 7b.

For modeling of the TMC pressure, initially a time duration is determined, which is referred to below as the variable Timer. The variable Timer gives the time duration between the deceleration of the vehicle initiated by a braking process and the point in time of the onset of regulation of the braking process, wherein the braking process is triggered by operation of the brake pedal 16. The value of the variable Timer depends on the actuation speed of the brake pedal 16, i.e. on whether there is a hard, medium or soft brake pedal 16 operation. The variable Timer is thus included when determining the model upstream pressure $P_{TMC\_mod}$.

First the generation of the variable Timer is explained below using FIGS. 2, 3 and 4.

Figure 2:
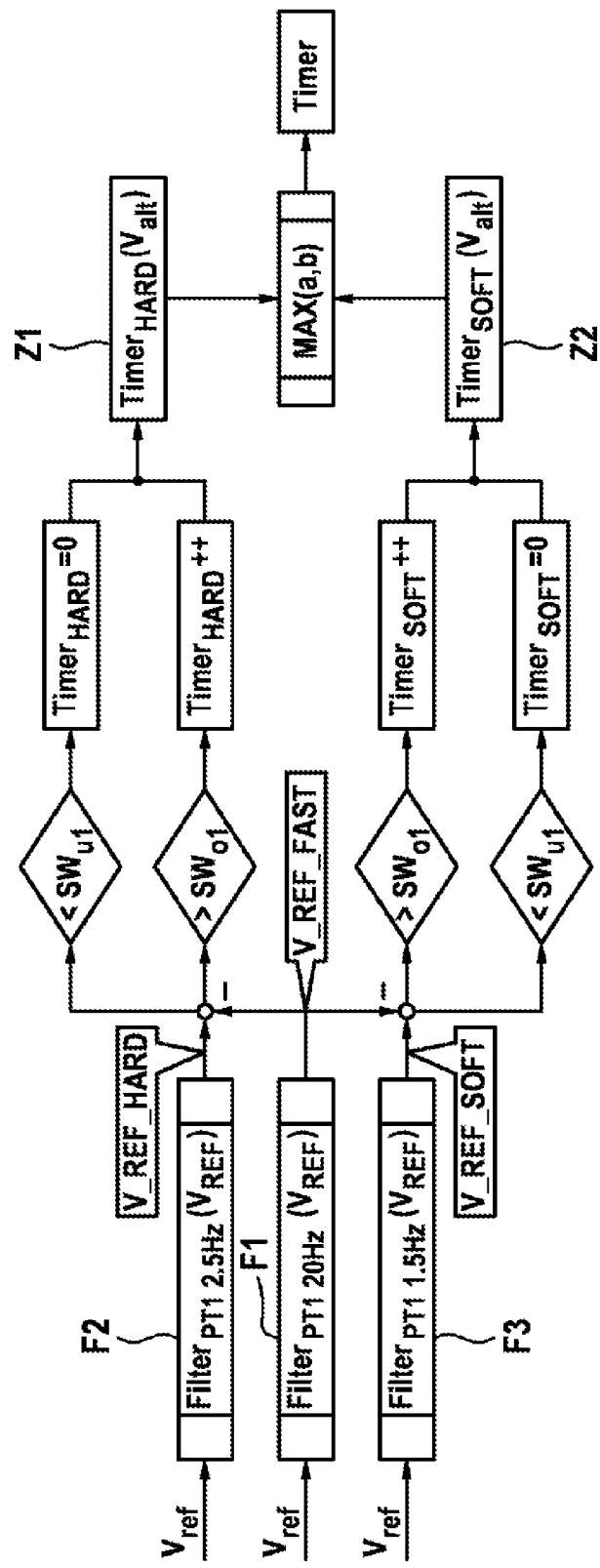
FIG. 2 shows a schematic flow chart for determining the time duration Timer in accordance with an exemplary embodiment of the invention.

According to FIG. 2, the speed of the vehicle $V_{ref}$ determined from the revolution rate sensors 10a and 10b is fed to a first, second and third low pass filter F1, F2 and F3. The low pass filters F1, F2 and F3 are implemented as first order filters with a limit frequency $f_{g1}$=20 Hz, $f_{g2}$=2.5 Hz and $f_{g3}$=1.5 Hz. The vehicle speed $V_{ref}$ signals that are low pass filtered in this way, which are referred to in accordance with FIG. 2 with $V_{ref\_fast}$, $V_{ref\_hard}$ and $V_{ref\_soft}$, are subjected to the analysis of a threshold value comparison.

Figure 4:
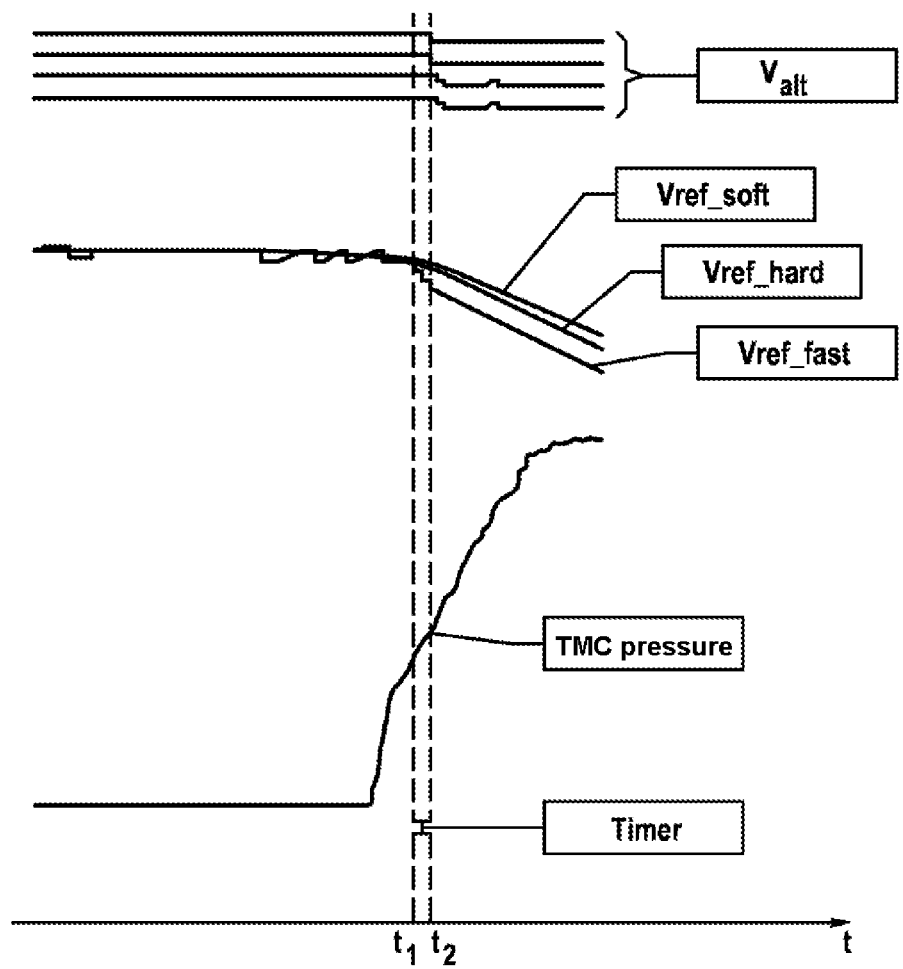
FIG. 4 shows a time profile of the variables necessary for the time duration Timer in accordance with FIG. 2.

The profiles of the signals $V_{ref\_fast}$, $V_{ref\_hard}$ and $V_{ref\_soft}$ are shown in FIG. 4, from which it is apparent that these change to a negative gradient at the point in time $t_1$, i.e. they have a "kink", which is characteristic of the start of a deceleration of the vehicle initiated by a brake pedal confirmation. In the FIG. 4 it can further be identified that the "characteristic kink" is more pronounced the harder the braking, i.e. the higher is the actuation speed. A high actuation speed also causes a high pressure rise gradient of the corresponding upstream pressure.

Prior to the threshold value comparison, in accordance with FIG. 2 the two differences ($V_{ref\_hard}-V_{ref\_fast}$) and ($V_{ref\_soft}-V_{ref\_fast}$) are formed and are respectively compared with an upper threshold value $SW_{o1}$ with a value of 0.3 km/h and a lower threshold value $SW_{u1}$ with a value of 0.1 km/h. If the upper threshold value $SW_{o1}$ is exceeded by the two difference signals, a counter Z1 or Z2 is incremented, but if the value is below the lower threshold value $SW_{u1}$, this causes resetting of the respective counter Z1 or Z2. The upper and lower threshold values $SW_{o1}$ and $SW_{u1}$ are selected vehicle-specifically. The counters Z1 and Z2 are previously set to an initial value, e.g. to the value 0.

With the next occurring point in time $t_2$ of the start of regulation of the braking process, the value of the counter Z1 or Z2 whose counter value has the highest value is stored as the variable Timer in the controller 20. The model upstream pressure $P_{TMC\_mod}$ is then modeled using the value of the variable Timer.

For determining the point in time $t_2$, a variable $V_{alt}$ from the brake regulation is used, which indicates the start of the control of an inlet valve 7a or 7b or of an outlet valve 8a or 8b. The variable $V_{alt}$ is available for each wheel 11 and 12 (and for the wheels of the brake circuit II) of the vehicle, hence the profile of four such variables is shown in FIG. 4. In addition, FIG. 4 also shows the profile of the TMC pressure.

The limit frequencies $f_{g2}$ and $f_{g3}$ of the low pass filters F2 and F3 are selected to be low enough for hard braking or soft braking to be optimally imposed in the low pass filtered vehicle speed signal $V_{ref\_hard}$ or $V_{ref\_soft}$, wherein the property of digital filters is used whereby a decreasing value is also produced for low limit frequencies with a decreasing signal.

The limit frequency $f_{g1}$ of the low pass filter F1 is selected to be significantly higher compared to the limit frequencies $f_{g2}$ and $f_{g3}$, whereby slow changes, especially an offset drift, which is eliminated by the difference formation, are detected with the relatively high limit frequency $f_{g1}$ compared to the two limit frequencies $f_{g2}$ and $f_{g3}$.

Figure 5:
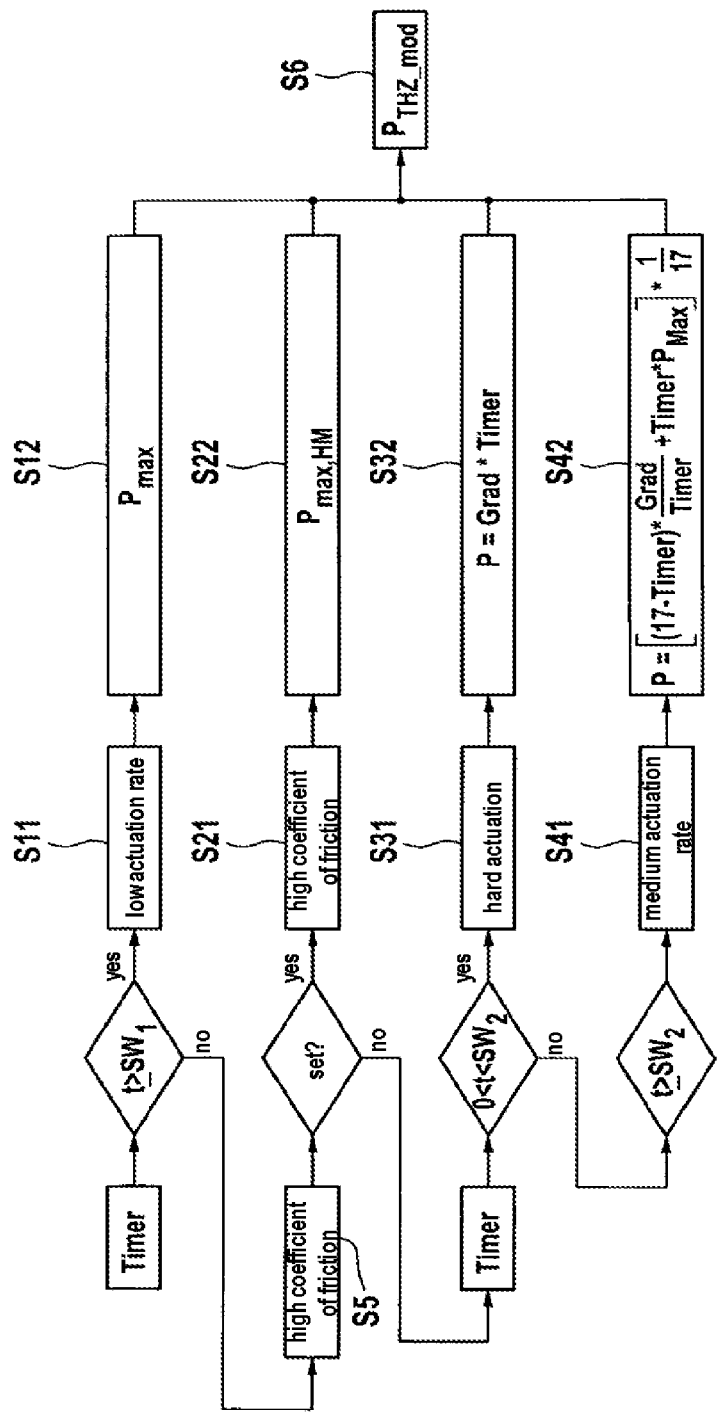
FIG. 5 shows a schematic flow chart for determining the model upstream pressure from the time duration Timer in accordance with an exemplary embodiment of the invention.

For modeling the model upstream pressure $P_{TMC\_mod}$, in accordance with FIG. 5 the value of the variable Timer is analyzed by threshold value comparison with a first and second threshold value $SW_1$ and $SW_2$. First the variable Timer is compared with the first threshold value $SW_1$, which preferably has a value of 25. If the value of the variable Timer is greater than or equal to the first threshold value $SW_1$, soft braking is assumed, i.e. a low actuation speed in accordance with the following step S11. For this case, in step S12 a pressure $P_{max}$ for the onset of regulation is determined by means of a vehicle-specific brake pressure-deceleration characteristic stored in the controller 20 depending on the measured deceleration of the vehicle and is output in step S6 as the model upstream pressure $P_{TMC\_mod}$.

If the variable Timer is lower than the first threshold value $SW_1$, a coefficient of friction detection is carried out in step S5, and in the case of a detected high coefficient of friction, i.e. of 1≤μ in accordance with step S21, in the following step S22 a pressure $P_{max,HM}$ is also obtained from the brake pressure-deceleration characteristic, but for a deceleration value of 1 g, and the pressure $P_{max,HM}$ is output in step S6 as the model upstream pressure $P_{TMC\_mod}$.

If, however, a high coefficient of friction is not detected, the value of the variable Timer is compared with a second threshold value $SW_2$, which preferably has a value of 10. If the value of the variable Timer is below the second threshold value $SW_2$, in step S31 hard braking, i.e. a high actuation speed, is detected. According to the following step S32, an estimated pressure P is computed as the product of the variable Timer and a variable Grad. The estimated pressure P is output in step S6 as the model upstream pressure $P_{TMC\_mod}$.

For determining the variable Grad, a further mathematical pressure model is used, namely a vehicle-specific TMC pressure gradient-coefficient of friction characteristic stored in the brake system. The variable Grad is thus determined depending on the detected coefficient of friction and represents the expected TMC pressure gradient.

If, however, the variable Timer is equal to or greater than the second threshold value $SW_2$ (but less than the first threshold value $SW_1$), in step S41 medium braking, i.e. a medium actuation speed, is assumed, and in the following step S42 by means of an estimation function a
pressure P is computed, which is output in step S6 as the model upstream pressure $P_{TMC\_mod}$.

The estimation function for P is determined vehicle-specifically depending on the variables Grad and Timer and on the value $P_{max}$ and is e.g. given by $$P = \left[(17 - \text{Timer}) \times \frac{Grad}{\text{Timer}} + \text{Timer} \times P_{max}\right].$$

Figure 3:
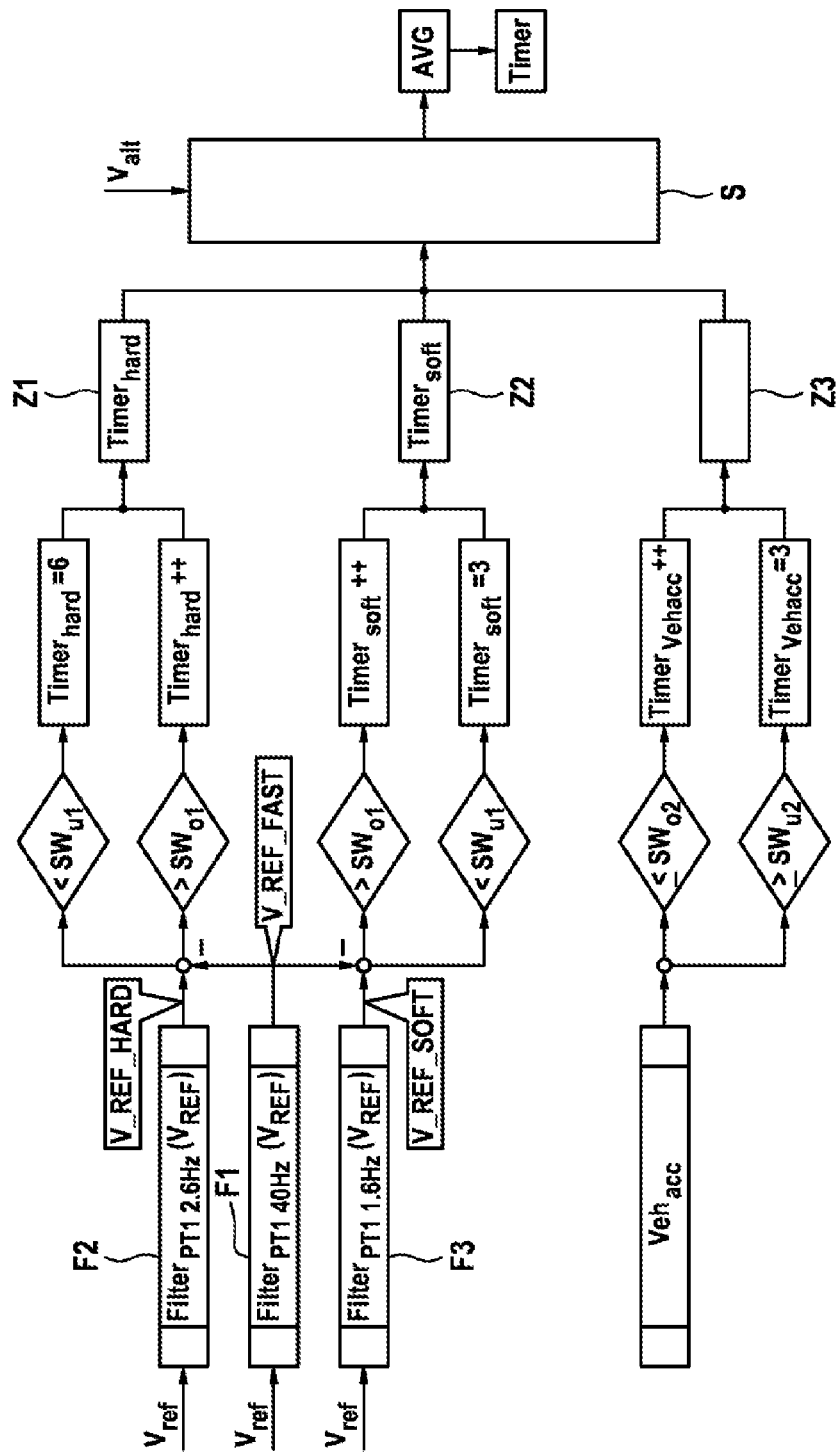
FIG. 3 shows a schematic flow chart for determining the time duration Timer in accordance with another exemplary embodiment of the invention.
Figure 6:
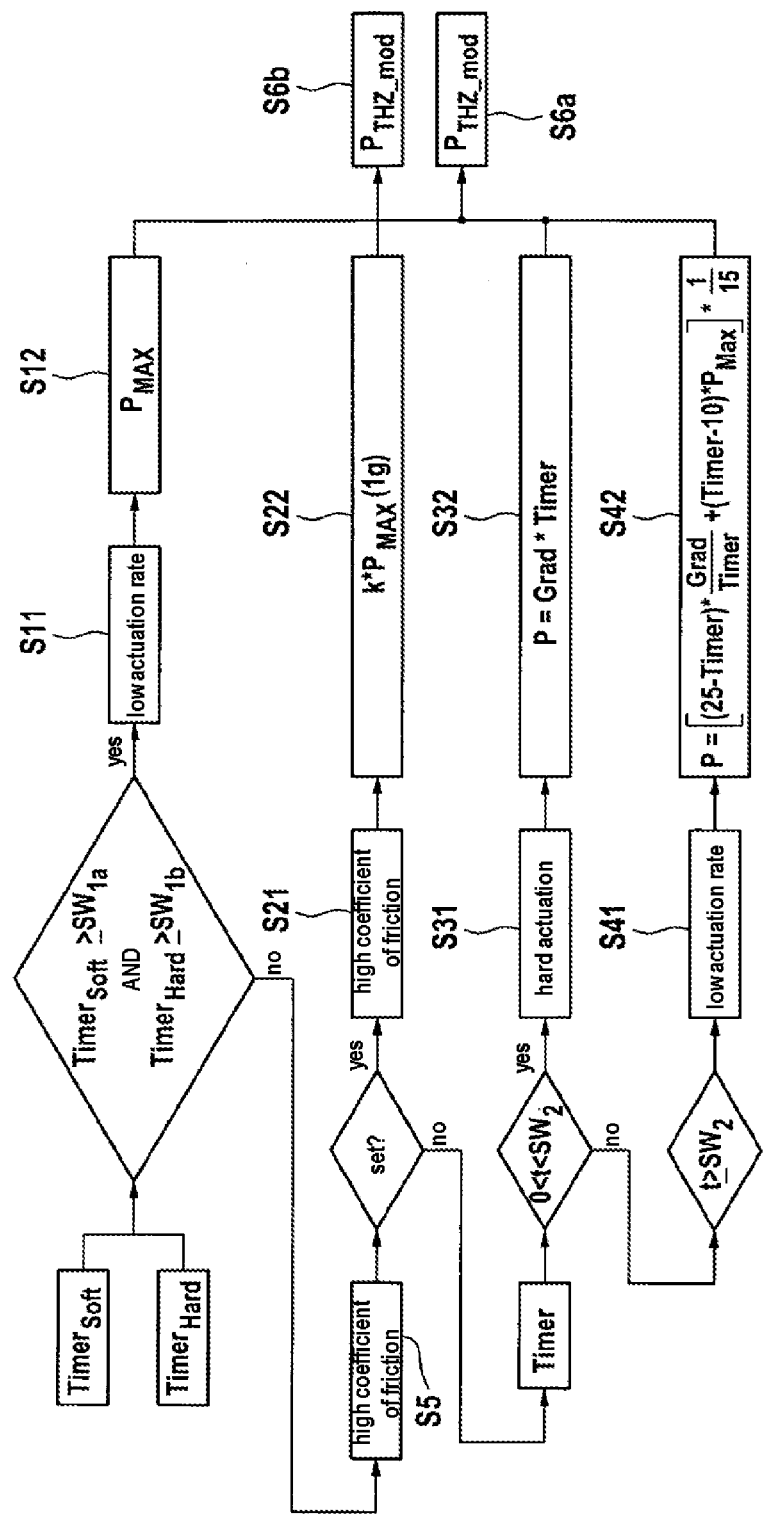
FIG. 6 shows a schematic flow chart for determining the model upstream pressure from the time duration Timer in accordance with a further exemplary embodiment of the invention.

FIG. 3 and FIG. 6 show an alternative determination of the variable Timer and its use for determining the model upstream pressure $P_{TMC\_mod}$, respectively. With this the robustness of the determination of the model upstream pressure $P_{TMC\_mod}$, i.e. the reliability, is improved.

The difference of the determination of the variable Timer in accordance with FIG. 3 in comparison with FIG. 2 is that a third counter Z3 is provided, which takes into account the unfiltered deceleration of the vehicle $\text{Veh}_{acc}$ derived from the wheel revolution rates by incrementing the counter Z3 once the deceleration of the vehicle $\text{Veh}_{acc}$ exceeds an upper threshold value $SW_{o2}$ with a value of 0.08 g and by resetting it if the deceleration of the vehicle $\text{Veh}_{acc}$ is less than a lower threshold value $SW_{u2}$ with a value of 0.06. A further difference from FIG. 2 is that the first low pass filter F1 includes a limit frequency $f_{g1}$ of 40 Hz. According to FIG. 3, the counters Z1, Z2 and Z3 are preset to an initial value, e.g. counter Z1 is set to the value 6 and counter Z2 and counter Z3 are each set to the value 3.

An analysis of the counter values of the three counters Z1, Z2 and Z3 is carried out by means of a selector S, wherein the counter value with the highest value is discarded at the next occurring point in time $t_2$ of the start of regulation of the braking process, which is provided with the variable $V_{alt}$, then the average value of the two remaining counter values is formed with a functional unit AVG and stored as the variable Timer. With the value of the variable Timer the model upstream pressure $P_{TMC\_mod}$ is then modeled in accordance with FIG. 6, which is explained below.

For modeling the model upstream pressure $P_{TMC\_mod}$, in accordance with FIG. 6 not only is the value of the variable Timer analyzed by threshold value comparison, but also the counter values $Timer_{soft}$ and $Timer_{hard}$ of the first or second counter Z1 or Z2 are compared in accordance with FIG. 3 with a first threshold value $SW_{1a}$ or a further first threshold value $SW_{1b}$. If the value of the variable $Timer_{soft}$ is greater than or equal to the first threshold value $SW_{1a}$ (preferably 50) and the value of the variable $Timer_{hard}$ (preferably 25) is greater than or equal to the further first threshold value $Timer_{hard}$ (preferably 25), soft braking, i.e. a low actuation speed, is assumed in accordance with the following step S11. In this case, in step S12 a pressure $P_{max}$ for the onset of regulation is determined by means of a vehicle-specific and axle-dependent brake pressure-deceleration characteristic stored in the controller 20 depending on the measured deceleration of the vehicle, and the larger of the two pressures in step S6a is output as the model upstream pressure $P_{TMC\_mod}$.

If the conditions for the two variables $Timer_{soft}$ and $Timer_{hard}$ are not fulfilled, a coefficient of friction detection is performed in step S5 and in the case of a detected high coefficient of friction in accordance with step S21, i.e. for $1 \leq \mu$, a pressure $P_{max}(1\,g)$ is likewise obtained in the following step S22 from the brake pressure-deceleration characteristic for a 1 g deceleration.

Because the brake pressure-deceleration characteristic represents the relationship between the locking pressure and the deceleration of the vehicle in the steady state during regulation, a factor k (normally 1 to 1.3) can be taken into account, with which the pressure $P_{max}(1\,g)$ determined from the characteristic is multiplied to account for the pressure increase at the start of regulation. The pressure $k*P_{max}(1\,g)$ is output in step S6b as the model upstream pressure $P_{TMC\_mod}$.

If, however, a high coefficient of friction is not detected, the value of the variable Timer determined in accordance with FIG. 3 is compared with a second threshold value $SW_2$, which preferably has a value of 10. If the value of the variable Timer is lower than the second threshold value $SW_2$, in step S31 hard braking, i.e. a high actuation speed, is detected. According to the following step S32, an estimated pressure P is computed as the product of the variable Timer and a variable Grad that has already been explained in connection with the description of FIG. 5. The estimated pressure P, which is limited to the pressure given for a 1 g deceleration by the brake pressure-deceleration characteristic, is output in step S6a as the model upstream pressure $P_{TMC\_mod}$.

If, however, the variable Timer is equal to or greater than the second threshold value $SW_2$ (but less than the first threshold value $SW_1$), in step S41 medium braking, i.e. an average actuation speed, is assumed and in the following step S42 a pressure P is computed by means of an estimation function and is output in step S6 as a model upstream pressure $P_{TMC\_mod}$.

The estimation function for P is determined vehicle-specifically depending on the variables Grad and Timer and on the value $P_{max}$ and is e.g. given by:

$$P = \left[(25 - \text{Timer}) \times \frac{Grad}{\text{Timer}} + (\text{Timer} - 10) \times P_{max}\right] \times \frac{1}{15}$$

For all computation paths in accordance with FIG. 6 it is true that the modeled model upstream pressure $P_{TMC\_mod}$ is limited to a lower limit, which represents the pressure from the brake pressure-deceleration characteristic for the current deceleration, and an upper limit, which represents the pressure from the brake pressure-deceleration characteristic at a 1 g deceleration. The second computation path with step S6b represents a special case, in which the upper limit can still be increased by the factor k.

The model upstream pressure $P_{TMC\_mod}$ modeled in accordance with FIGS. 5 and 6 is used as the starting value for the brake pressure in the wheels, so that the brake regulation process, e.g. ABS regulation, can be carried out with this. The model upstream pressure $P_{TMC\_mod}$ modeled according to the invention can be replaced during brake regulation by the known TMC pressure estimate from the pump revolution rate of the hydraulic pump 3 or from the stopping behavior in the PWM mode.

The initialization of the model upstream pressures used for each wheel takes place to the value of the first estimated $P_{TMC\_mod}$, wherein depending on the computation path executed for the estimated $P_{TMC\_mod}$, a correction factor can still be taken into account that accounts for the system-related dead time between the build-up of the pressure applied by the driver in the brake master cylinder 9 and in the respective wheel.

In order to bridge the time since the onset of regulation, up to which a pressure estimation from the pump voltage is possible, the model upstream pressure $P_{TMC\_mod}$ estimated at the onset of regulation is ramped further, i.e. gradually increased with a specified gradient. The gradient can be made dependent on the time for which an inlet valve has already carried out a regulation process. With increasing time duration, the gradient also decreases, which e.g. can be determined from the quotient of the estimated model upstream pressure $P_{TMC\_mod}$ and the variable Timer.

Because the information about the pressure difference occurring across the inlet valves is only required for the first pressure build-up, the robustness of the determination of the modeled model upstream pressure $P_{TMC\_mod}$ is increased further, whereby the wheel behavior is continuously observed and the estimated model upstream pressure $P_{TMC\_mod}$ is thus plausibility checked. In the case of a subsequent low coefficient of friction detection, because of the assumption of a high coefficient of friction an incorrectly estimated model upstream pressure $P_{TMC\_mod}$ and the model-upstream pressures $P_{TMC\_mod}$ associated with each wheel are corrected downwards. The plausibility checking is mainly useful for a low coefficient of friction, because a longer pressure decrease normally precedes the first pressure build-up in that case and thus sufficient time remains for the analysis of the wheel behavior.

In the exemplary embodiments it is assumed from this that no TMC pressure sensor is provided. The method according to the invention is not limited to this, but can also be used for a fallback mode, i.e. in the case of a failure or a defect of an existing TMC sensor. In particular, in such a fallback mode, if TMC pressure estimation by using the pump revolution rate is not being used, adequate digital valve control of the inlet valves 7a and 7b or of the outlet valves 8a and 8b can be guaranteed, which is better than the methods that are known in the prior art.

While the above description constitutes the preferred embodiment of the present invention, it will be appreciated that the invention is susceptible to modification, variation and change without departing from the proper scope and fair meaning of the accompanying claims.

The invention claimed is:

1. A method for determining a model upstream pressure ($P_{TMC\_mod}$) by means of a mathematical model in an electronically regulated motor vehicle brake system, in which regulation of an electrically controllable hydraulic valve causing a build-up of brake pressure on at least one wheel brake is carried out using the model upstream pressure ($P_{TMC\_mod}$) as at least one parameter, and the brake system having wheel sensors for providing a vehicle speed signal indicating the speed of the vehicle and having a brake pedal that can be operated, comprising the steps of:

from the vehicle speed signal ($v_{ref}$) generating at least a first low pass filtered vehicle speed signal by means of at least a first low pass filter with a first limit frequency ($f_{g1}$), from whose time profile a first point in time ($t_1$) of a significant decrease in speed is detected, which decrease is used as a starting criterion for determining a time duration (Timer) starting with a deceleration of the vehicle initiated by a braking process, which time duration (Timer) ends at a second point in time ($t_2$) at an onset of electronic regulation of the braking process, comparing the time duration (Timer) with at least one of a first or a second threshold time value ($SW_1$, $SW_2$) for determining a class of an actuation speed of the brake pedal, and depending on the result of the comparing step, determining the model upstream pressure ($P_{TMC\_mod}$) by means of the mathematical model.

2. The method as claimed in claim 1, further comprising; producing a second low pass filtered vehicle speed signal ($V_{ref\_hard}$) by means of a second low pass filter (F2) with a lower second limit frequency ($f_{g2}$) compared to the first limit frequency ($f_{g1}$), and for determining the first point in time ($t_1$) used for computation of the time duration, controlling a first counter (Z1) depending on the difference of the first and the second low pass filtered vehicle speed signals.

3. The method as claimed in claim 2, further comprising; generating a third low pass filtered vehicle speed signal ($v_{ref\_soft}$) by means of a third low pass filter (F3) with a lower third limit frequency ($f_{g3}$) compared to the second limit frequency ($f_{g2}$), and for determining the first point in time serving as a starting criterion for the computation of the time duration, controlling a second counter (Z2) depending on the difference of the first and the third low pass filtered vehicle speed signals ($V_{ref\_fast}$, $V_{ref\_soft}$).

4. The method as claimed in claim 3, further comprising in that the first or the second counter (Z1, Z2) is incremented if the difference of the first and the second, or the first and the third low pass filtered vehicle speed signals ($V_{ref\_fast}$, $V_{ref\_hard}$, $V_{ref\_soft}$) exceeds a first threshold speed value ($SW_{o1}$) and are reset if below a second threshold speed value ($SW_{u1}$).

5. The method as claimed in claim 4, further comprising in that with the start of regulation of the braking process at the second point of time, the counter value of the first or second counter (Z1, Z2) whose value has the highest counter value is used to set the time duration (Timer).

6. The method as claimed in claim 4, further comprising; determining the deceleration of the vehicle from the vehicle speed signal of the wheel sensor and is compared with an upper threshold speed value ($SW_{o2}$) and a lower threshold speed value ($SW_{u2}$), and a third counter (Z3) is provided which is incremented if the deceleration of the vehicle exceeds the upper threshold speed value ($SW_{o2}$) and is reset if the deceleration of the vehicle is less than the lower threshold speed value ($SW_{o1}$).

7. The method as claimed in claim 6, further comprising in that with the start of regulation of the braking process, two counter values with the lowest values are selected from the counter values of the first, the second, and the third counters, wherein the average value of the counter values of two of the counters is used as the value of the time duration.

8. The method as claimed in claim 1 further comprising in that a vehicle-specific brake pressure-deceleration characteristic stored in the brake system is provided as part of the mathematical model for determining the model upstream pressure ($P_{TMC\_mod}$).

9. The method as claimed in claim 8, further comprising in that the model upstream pressure ($P_{TMC\_mod}$) is determined from the deceleration of the motor vehicle and the brake pressure-deceleration characteristic if the time duration has at least the value of the first threshold time value.

10. The method as claimed in claim 9, further comprising estimating the coefficient of friction and, on identifying a road with a high coefficient of friction with a specified deceleration value, the model upstream pressure ($P_{TMC\_mod}$) is determined by means of the brake pressure-deceleration characteristic if the time duration is less than the first threshold time value ($SW_1$, $SW_2$).

11. The method as claimed in claim 9, further comprising in that the model upstream pressure ($P_{TMC\_mod}$) is determined from the deceleration of the motor vehicle and the brake pressure-deceleration characteristic if the counter value ($Timer_{hard}$) of the first counter (Z1) is greater than or equal to a first threshold time value ($SW_{1a}$) and the counter value ($Timer_{soft}$) of the second counter (Z2) is greater than or equal to a modified first threshold time value ($SW_{1b}$).

12. The method as claimed in claim 11, further comprising in that an estimation of the coefficient of friction is carried out and, on identifying a road with a high coefficient of friction with a specified deceleration value, the model upstream pressure ($P_{TMC\_mod}$) is determined by means of the brake pressure-deceleration characteristic if at least the counter value ($Timer_{hard}$) of the first counter (Z1) or the counter value ($Timer_{soft}$) of the second counter (Z2) is less than the first threshold time value ($SW_{1a}$) or the modified first threshold time value ($SW_{1b}$).

13. The method as claimed in claim 10 further comprising;

a vehicle-specific TMC pressure gradient-coefficient of friction characteristic stored in the brake system is provided as the mathematical model for determining the model upstream pressure ($P_{TMC\_mod}$), and the model upstream pressure ($P_{TMC\_mod}$) is computed as the product of the TMC pressure gradient (Grad) determined by means of the coefficient of friction and the TMC pressure gradient-coefficient of friction characteristic and of the value of the time duration (Timer) if there is no high coefficient of friction and the value of the time duration (Timer) is less than a second threshold time value ($SW_2$).

14. The method as claimed in claim 10, further comprising;

a vehicle-specific TMC pressure gradient-coefficient of friction characteristic stored in the brake system is provided as the mathematical model for determining the model upstream pressure ($P_{TMC\_mod}$), and the model upstream pressure ($P_{TMC\_mod}$) is determined as an estimation function depending on the TMC pressure gradient (Grad) determined by means of the coefficient of friction and the TMC pressure gradient-coefficient of friction characteristic, on the value of the time duration (Timer) and on the pressure value ($P_{max}$) determined from the deceleration of the motor vehicle and the brake pressure-deceleration characteristic if there is no high coefficient of friction and the value of the time duration (Timer) reaches the second threshold time value ($SW_2$) and is less than the first threshold time value ($SW_1$).

15. The method as claimed in a claim 1 further comprising in that the first low pass filter and a second and a third low pass filter (F1, F2, F3), is used for respectively generating the first, a second, and a third low pass filtered vehicle speed signals ($V_{ref\_fast}$, $V_{ref\_hard}$, $V_{ref\_soft}$).

* * * * *